United States Patent [19]

Hall et al.

[11] Patent Number: 5,004,308

[45] Date of Patent: Apr. 2, 1991

[54] RUGATE REFLECTOR

[75] Inventors: Randolph L. Hall, Newbury Park, Calif.; Christopher D. Johnson, Lawrenceville, Ga.

[73] Assignee: Rockwell International Corporation, El Segundo, Calif.

[21] Appl. No.: 527,626

[22] Filed: May 23, 1990

[51] Int. Cl.$^5$ .............................................. G02B 5/28
[52] U.S. Cl. ...................... 350/1.7; 350/166; 350/642
[58] Field of Search ............... 350/164, 166, 602, 1.1, 350/1.6, 1.7

[56] References Cited

U.S. PATENT DOCUMENTS

| | | | |
|---|---|---|---|
| 3,858,977 | 1/1975 | Baird et al. | 350/166 |
| 4,101,200 | 7/1978 | Daxinger | 350/1.7 |
| 4,298,806 | 11/1981 | Herold | 250/504 |
| 4,408,825 | 10/1983 | Stelmack | 350/1.7 |
| 4,545,646 | 10/1985 | Chern | 350/162 |
| 4,582,764 | 4/1986 | Allerd et al. | 350/1.7 |
| 4,602,847 | 7/1986 | Born | 350/166 |
| 4,604,680 | 8/1986 | Levin | 362/293 |
| 4,640,867 | 2/1987 | Oyama | 428/432 |
| 4,645,290 | 2/1987 | Walsh | 350/1.7 |
| 4,695,930 | 9/1987 | Wierzbicki | 362/293 |
| 4,721,349 | 1/1988 | Fan et al. | 350/166 |
| 4,846,551 | 7/1989 | Rancourt et al. | 350/166 |

OTHER PUBLICATIONS

Walker, U.S. Statutory Invention Registration No. H101 (Aug. 5, 1986).

*Primary Examiner*—Bruce Y. Arnold
*Assistant Examiner*—J. P. Ryan
*Attorney, Agent, or Firm*—John J. Deinken

[57] ABSTRACT

An optical reflector includes a substrate, an absorbing layer deposited on the substrate for absorbing light within a broad range of wavelengths, and a rugate film deposited on the absorbing layer and adapted to reflect wavelengths of light within a predetermined range. The reflector may further include a buffer layer disposed between the substrate and the absorbing layer for promoting the adhesion of the absorbing layer to the substrate.

8 Claims, 1 Drawing Sheet

RUGATE REFLECTOR

BACKGROUND OF THE INVENTION

This invention is concerned with techniques for selecting particular wavelengths of incoming optical radiation.

Reflective surfaces in optical systems are generally made by coating a surface with a thin metal layer, such as gold, silver, aluminum, etc. This technique produces a mirror which reflects over a broad wavelength range. If the signal is to be delivered to a narrowband optical system, subsequent spectral filtering is required to eliminate out of band wavelengths. Installing one or more of such filters spaced along the optical path from the reflective surface, however, can introduce some undesirable features in the system, including additional transmission loss of the optical signal, greater complexity, and the introduction of out of band scattered light from the filter into the optical system.

Consequently, an optical reflector which is inherently capable of also selectively reflecting a narrow band of radiation, while efficiently rejecting out of band wavelengths, would be desirable.

SUMMARY OF THE INVENTION

This invention provides an optical reflector which can simultaneously selectively reflect a narrow band of radiation and efficiently reject undesirable wavelengths. The optical reflector of this invention includes a substrate; an absorbing layer deposited on the substrate for absorbing light within a broad range of wavelengths; and a rugate film deposited on the absorbing layer and adapted to reflect wavelengths of light within a predetermined range.

The reflector may further include a buffer layer disposed between the substrate and the absorbing layer for promoting the adhesion of the absorbing layer to the substrate.

In a specific embodiment, the substrate is formed from aluminum and the buffer layer of titanium. Furthermore, the absorbing layer may be a multilayer absorber, with alternating layers of chromium and SiO disposed between the buffer layer and the rugate film. These alternating layers may also be graded between the buffer layer and the rugate film, such that the chromium layers are relatively thicker proximate the buffer layer and the SiO layers are relatively thicker proximate the rugate film.

DESCRIPTION OF THE INVENTION

Figure 1:
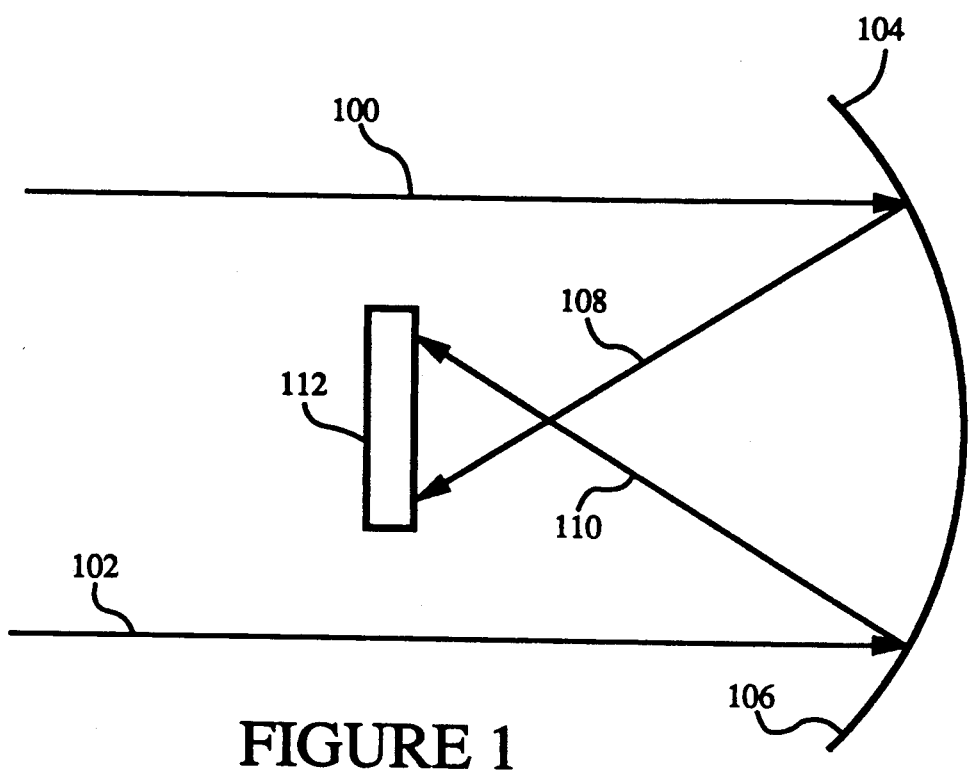
FIG. 1 is a schematic diagram illustrating one type of optical system in which the present invention can be used.

FIG. 1 is a schematic diagram illustrating one type of optical system in which the present invention can be used. In FIG. 1, an incoming beam of broadband optical radiation is indicated by the lines 100 and 102. The incoming radiation impinges on a reflector 104. The reflector 104, as will be explained further below, is provided with layers on its surface 106 constructed according to this invention. As a consequence, the reflector 104 reflects only the portion of the incoming beam which is within a predetermined narrow spectral band. This narrowband radiation, as indicated by the line 108 and 110, is focused by the curvature of the reflector 104 onto a detector 112 for subsequent analysis of the signal represented by that radiation. The remainder of the incoming beam, i.e., the radiation outside of the predetermined spectral band, is absorbed by the reflector 104.

Figure 2:
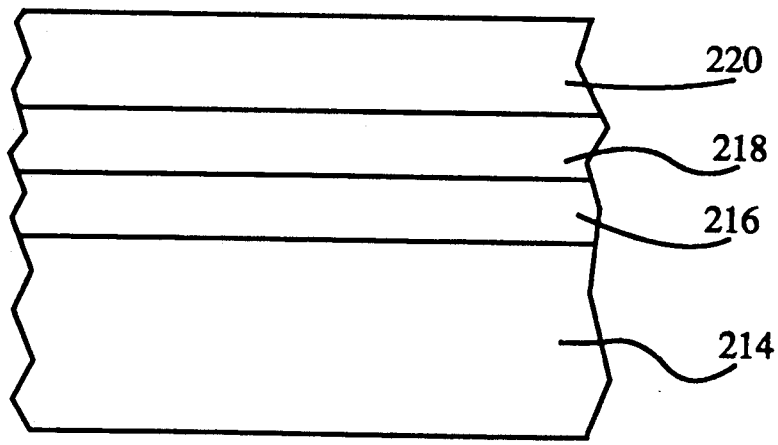
FIG. 2 is a cross sectional view illustrating the structure of a portion of the reflector illustrated in FIG. 1.

FIG. 2 is a cross sectional view illustrating the structure of a portion of the reflector 104. The reflector structure is supported by a substrate 214, typically formed of a metal such as aluminum. Deposited on the substrate 214 is a buffer layer 216 to promote adhesion between the substrate and subsequent layers. In the preferred embodiment, this buffer layer is titanium. Deposited on the buffer layer is an absorbing layer structure 218 which is designed to absorb light within a broad range of wavelengths. In the preferred embodiment, the absorbing layer structure is made up of alternating layers of chromium and SiO. In this example, the goal was to obtain a coating which effectively absorbed light in the wavelength range from 0.85 to 1.3 microns. Wavelengths below this range could easily be blocked with colored glass, such Schott BG850, while wavelengths above 1.3 microns were beyond the response of the detector 112. The chromium and SiO layers were graded so that the chromium layers are relatively thicker near the buffer layer and decrease in thickness with increasing distance from the buffer layer, while SiO layers are relatively thin near the buffer layer and increase in thickness with increasing distance from the buffer layer. Finally, a rugate film 220 is deposited on the absorbing layer. As those skilled in the art will appreciate, a rugate filter is an optical coating having a gradient-index distribution characterized by a continuously varying index of refraction. In particular, the variation in refractive index of a rugate film follows a sinusoidal pattern.

The rugate film 220 is designed to reflect wavelengths of light within the predetermined range. Rugate coatings are inherently narrow-band. In the preferred embodiment, the rugate layer was designed to reflect strongly at a wavelength of 1.06 microns. Thus, only the inband wavelengths of interest are reflected into the detector 112, thereby eliminating the need for any additional filtering between the reflector 104 and the detector 112. As a result, the system exhibits improved inband reflectivity, a reduction in out-of-band wavelengths, a parts count reduction by eliminating the need for a separate filter, and a simplified design.

The preferred embodiments of this invention have been illustrated and described above. Modifications and additional embodiments, however, will undoubtedly be apparent to those skilled in the art. The absorbing layer structure, for example, could be a continuous layer with varying concentrations of the two constituent materials. In addition, a spectrally selective conventional thin film could be used instead of the rugate layer of the preferred embodiment. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

We claim:

1. An optical reflector for selectively reflecting light within a predetermined range of wavelengths, comprising:
   a substrate;
   an absorbing layer deposited on the substrate for absorbing light within a broad range of wavelengths; and
   a rugate film deposited on the absorbing layer and adapted to reflect wavelengths of light within the predetermined range.

2. The reflector of claim 1, further comprising a buffer layer disposed between the substrate and the absorbing layer for promoting the adhesion of the absorbing layer to the substrate.

3. The reflector of claim 2, wherein the substrate further comprises aluminum and the buffer layer further comprises a layer of titanium.

4. The reflector of claim 3, wherein the absorbing layer further comprises a multilayer absorber comprising alternating layers of chromium and SiO disposed between the buffer layer and the rugate film.

5. The reflector of claim 4, wherein the alternating layers are graded between the buffer layer and the rugate film, such that the chromium layers are relatively thicker proximate the buffer layer and the SiO layers are relatively thicker proximate the rugate film.

6. An optical reflector for selectively reflecting light within a predetermined range of wavelengths, comprising:
   a substrate;
   a buffer layer deposited on the substrate;
   an absorbing layer deposited on the buffer layer for absorbing light within a broad range of wavelengths; and
   a rugate film deposited on the absorbing layer and adapted to reflect wavelengths of light within the predetermined range.

7. A method of making an optical reflector for selectively reflecting light within a predetermined range of wavelengths, comprising the steps of:
   providing a substrate;
   depositing an absorbing layer on the substrate for absorbing light within a broad range of wavelengths; and
   depositing a rugate film on the absorbing layer to reflect wavelengths of flight within the predetermined range.

8. The method of claim 7, further comprising the step of depositing a buffer layer on the substrate prior to depositing the absorbing layer for promoting the adhesion of the absorbing layer to the substrate.

* * * * *